US012614400B2

(12) United States Patent
Alonazi et al.

(10) Patent No.: US 12,614,400 B2
(45) Date of Patent: Apr. 28, 2026

(54) COMPUTER-IMPLEMENTED AUTOMATIC ANNOTATION OF A LiDAR POINT CLOUD

(71) Applicant: The Boeing Company, Arlington, VA (US)

(72) Inventors: Amani Alonazi, Jeddah (SA); Charles A. Erignac, Kirkland, WA (US)

(73) Assignee: The Boeing Company, Arlington, VA (US)

( * ) Notice: Subject to any disclaimer, the term of this patent is extended or adjusted under 35 U.S.C. 154(b) by 418 days.

(21) Appl. No.: 18/312,895

(22) Filed: May 5, 2023

(65) Prior Publication Data

US 2024/0371186 A1 Nov. 7, 2024

(51) Int. Cl.
*G06V 20/70* (2022.01)
*G06V 20/17* (2022.01)

(52) U.S. Cl.
CPC .............. *G06V 20/70* (2022.01); *G06V 20/17* (2022.01)

(58) Field of Classification Search
CPC ................................ G06V 20/70; G06V 20/17
See application file for complete search history.

(56) References Cited

U.S. PATENT DOCUMENTS

| | | | |
|---|---|---|---|
| 11,410,388 B1 * | 8/2022 | Taghavi ............. | G06V 10/7747 |
| 2021/0103033 A1 | 4/2021 | Sharma et al. | |
| 2021/0342609 A1 | 11/2021 | Smolyanskiy et al. | |
| 2023/0267615 A1 * | 8/2023 | Agia ........................ | G01S 17/42 |
| | | | 345/419 |

OTHER PUBLICATIONS

Lee et al, "Sensor Fusion for Aircraft Detection at Airport Ramps Using Conditional Random Fields" (published in IEEE Transactions on Intelligent Transportation Systems, vol. 23, No. 10, pp. 18100-18112, Oct. 2022).*
Thomas, H. et al., "Self-Supervised Learning of Lidar Segmentation for Autonomous Indoor Navigation," Proceedings of the 2021 IEEE International Conference on Robotics and Automation, Dec. 10, 2020, Xi'an, China, 7 pages.

(Continued)

*Primary Examiner* — Casey L Kretzer
(74) *Attorney, Agent, or Firm* — Alleman Hall LLP

(57) ABSTRACT

Examples are disclosed that relate an approach for automatically annotating a LiDAR point cloud of an airport with classification labels. In one example, a computing device comprises one or more processors configured to execute instructions stored in memory to receive LiDAR data for an airport environment, wherein the LiDAR data includes a LiDAR point cloud including a plurality of points in the airport environment, segment the LiDAR point cloud into a ground region and a non-ground region, automatically cluster, via a trained machine learning model, different points in the non-ground region into a plurality of non-ground segments, automatically annotate, via the trained machine learning model, the plurality of non-ground segments with classification labels selected from an airport domain, and output a panoptic labeled LiDAR point cloud including the plurality of non-ground segments labeled with respective classification labels and the points in the ground region.

20 Claims, 7 Drawing Sheets

(56) References Cited

OTHER PUBLICATIONS

Sauder, J. et al., "Self-Supervised Deep Learning on Point Clouds by Reconstructing Space," Proceedings of Advances in Neural Information Processing Systems 32: Annual Conference on Neural Information Processing Systems 2019, Jun. 2, 2019, Vancouver, Canada, 11 pages.

Qi, C. et al., "PointNet: Deep Learning on Point Sets for 3D Classification and Segmentation," Proceedings of the 2017 IEEE Conference on Computer Vision and Pattern Recognition, Apr. 10, 2017, Honolulu, HI, 19 pages.

European Patent Office, Extended European Search Report Issued in Application No. 24168219.4, Sep. 19, 2024, 9 pages.

* cited by examiner

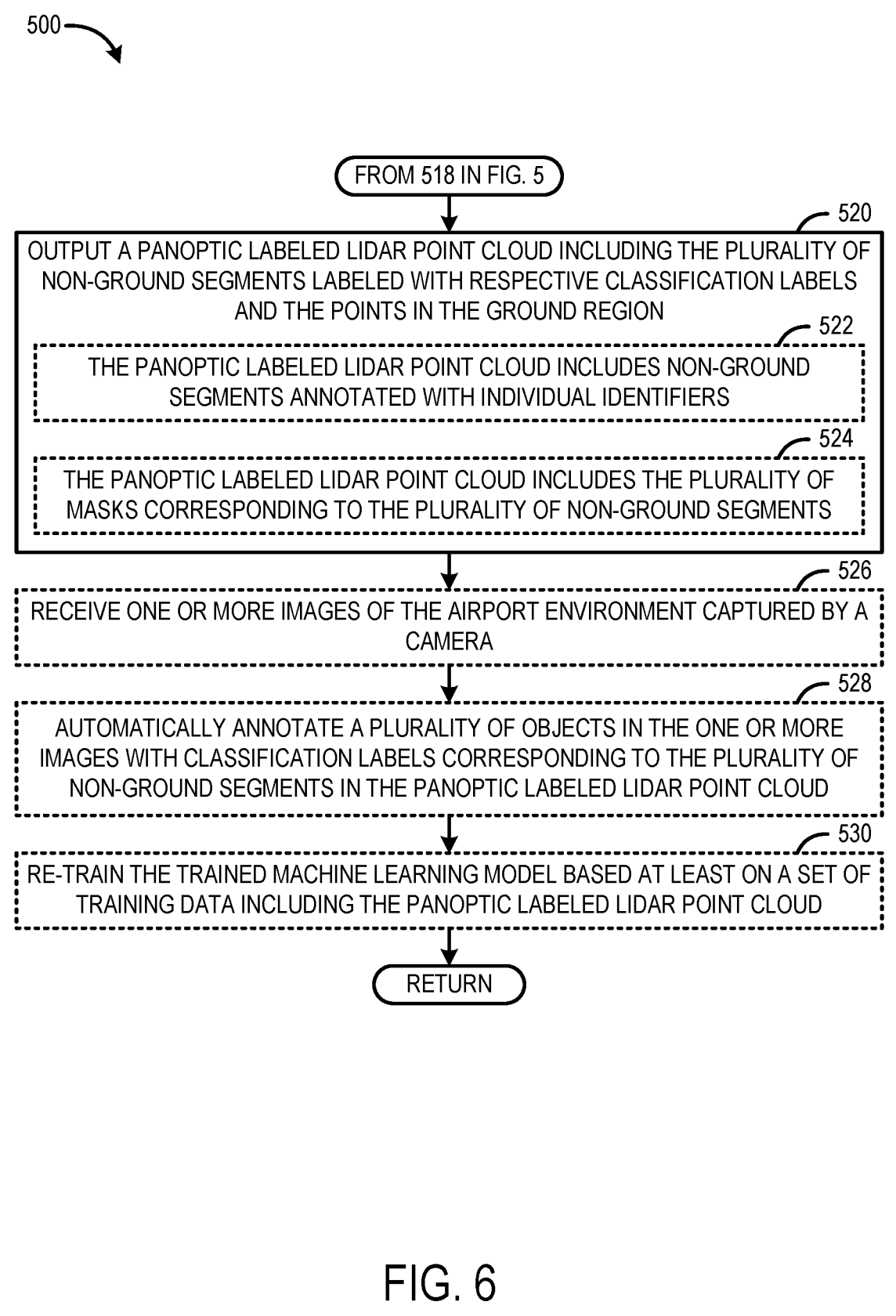

500

FROM 518 IN FIG. 5

520

OUTPUT A PANOPTIC LABELED LIDAR POINT CLOUD INCLUDING THE PLURALITY OF NON-GROUND SEGMENTS LABELED WITH RESPECTIVE CLASSIFICATION LABELS AND THE POINTS IN THE GROUND REGION

522

THE PANOPTIC LABELED LIDAR POINT CLOUD INCLUDES NON-GROUND SEGMENTS ANNOTATED WITH INDIVIDUAL IDENTIFIERS

524

THE PANOPTIC LABELED LIDAR POINT CLOUD INCLUDES THE PLURALITY OF MASKS CORRESPONDING TO THE PLURALITY OF NON-GROUND SEGMENTS

526

RECEIVE ONE OR MORE IMAGES OF THE AIRPORT ENVIRONMENT CAPTURED BY A CAMERA

528

AUTOMATICALLY ANNOTATE A PLURALITY OF OBJECTS IN THE ONE OR MORE IMAGES WITH CLASSIFICATION LABELS CORRESPONDING TO THE PLURALITY OF NON-GROUND SEGMENTS IN THE PANOPTIC LABELED LIDAR POINT CLOUD

530

RE-TRAIN THE TRAINED MACHINE LEARNING MODEL BASED AT LEAST ON A SET OF TRAINING DATA INCLUDING THE PANOPTIC LABELED LIDAR POINT CLOUD

RETURN

FIG. 6

COMPUTING SYSTEM 700

LOGIC PROCESSOR  702

VOLATILE MEMORY 704

NON-VOLATILE STORAGE DEVICE 706

DISPLAY SUBSYSTEM 708

INPUT SUBSYSTEM 710

COMMUNICATION SUBSYSTEM 712

COMPUTER-IMPLEMENTED AUTOMATIC ANNOTATION OF A LiDAR POINT CLOUD

FIELD

The present disclosure relates generally to the field of light detection and ranging (LiDAR), and more specifically to annotating a LiDAR point cloud with classification labels.

BACKGROUND

Light detection and ranging (LiDAR) uses laser light to measure distances by targeting an object or a surface with a laser and measuring the time for the reflected light to return to a receiver. LiDAR scanning can be performed to generate extremely accurate, detailed three-dimensional (3D) measurements of an environment including various features, such as the ground, vegetation, buildings, and other objects. LiDAR scanning produces a 3D point cloud of the scanned environment. The speed and accuracy of LiDAR made it feasible to map large areas with the kind of detail that before had only been possible with time-consuming and expensive ground survey crews.

LiDAR point clouds are commonly used to generate labeled maps of airport environments. Annotation of a LiDAR point cloud with classification labels is traditionally performed by humans. However, such human annotation of LiDAR point clouds representing airport environments can have issues. As one example, a human annotator, even if experienced, can create labeling errors that produce a mislabeled LiDAR point cloud that misrepresents an airport environment. As another example, the time it takes for a human annotator to annotate a LiDAR point cloud of an airport environment can be substantial to the point that the resulting human-annotated LiDAR point cloud of the airport environment can be rendered obsolete by the time it is finished. More particularly, dynamic objects may change position during the time it takes for the human annotator to produce the human-annotated LiDAR point cloud, such that it does not accurately represent the current state of the airport environment.

SUMMARY

Examples are disclosed that relate an approach for automatically annotating a light detection and ranging (LiDAR) point cloud of an airport with classification labels in a faster and more accurate manner than human annotation of a LiDAR point cloud. In one example, a computing device comprises one or more processors configured to execute instructions stored in memory to (1) receive LiDAR data for an airport environment, wherein the LiDAR data includes a LiDAR point cloud including a plurality of points in the airport environment, (2) segment the LiDAR point cloud into a ground region and a non-ground region, (3) automatically cluster, via a trained machine learning model, different points in the non-ground region into a plurality of non-ground segments, (4) automatically annotate, via the trained machine learning model, the plurality of non-ground segments with classification labels selected from an airport domain, and (5) output a panoptic labeled LiDAR point cloud including the plurality of non-ground segments labeled with respective classification labels and the points in the ground region.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIGS. 5-6 show a flowchart of an example computer-implemented method for automatically annotating a LiDAR point cloud with classification labels to generate a panoptic labeled LiDAR point cloud.

DETAILED DESCRIPTION

Figure 1:
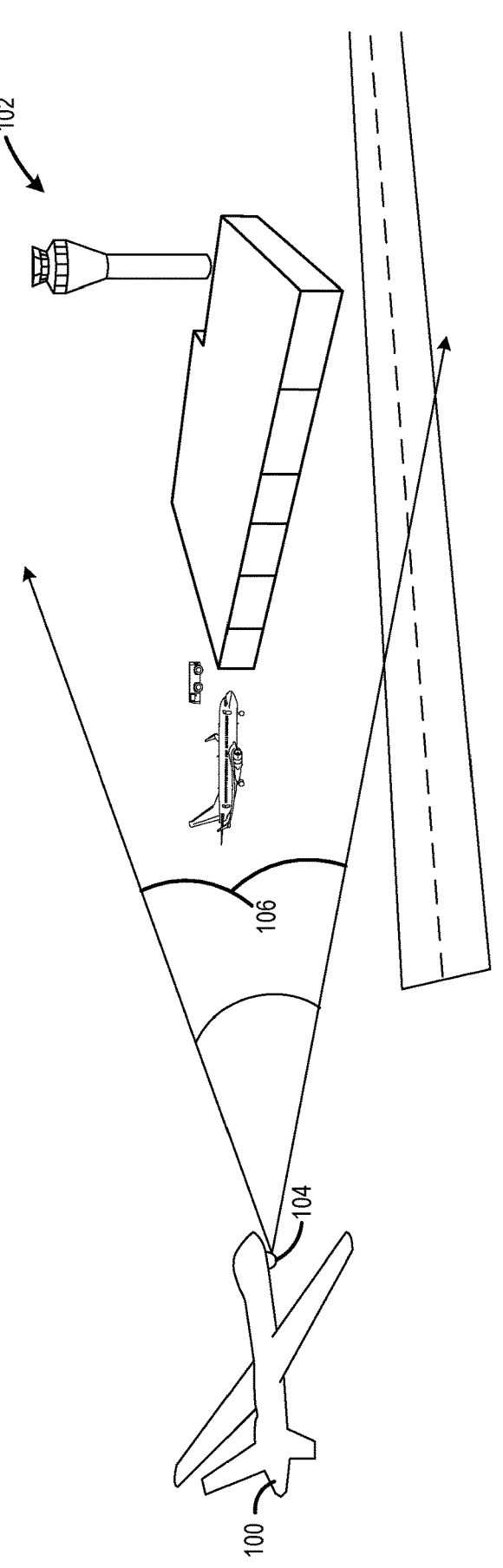
FIG. 1 shows an example scenario in which an aircraft scans an airport environment with a light detection and ranging (LiDAR) device to acquire LiDAR data for the airport environment.

The present description is directed to a computer-implemented approach for automatically annotating a light detection and ranging (LiDAR) point cloud of an airport with classification labels in a faster and more accurate manner than human annotation of a LiDAR point cloud. In one example, LiDAR data for an airport environment is received, the LiDAR data including a LiDAR point cloud with a plurality of points representing the airport environment. The LiDAR point cloud is segmented into a ground region and a non-ground region. Different points in the non-ground region are automatically clustered, via a trained machine learning model, into a plurality of non-ground segments. The plurality of non-ground segments are automatically annotated, via the trained machine learning model, with classification labels selected from an airport domain. A panoptic labeled LiDAR point cloud is output. The panoptic labeled LiDAR point cloud includes the plurality of non-ground segments labeled with respective classification labels and the points in the ground region.

The computer-implemented approach performs unsupervised panoptic segmentation of a LiDAR point cloud of an airport environment using auto-learning/self-learning techniques that enable automatic annotation of the LiDAR point cloud with classification labels without human involvement. The computer-implemented approach intelligently segments the LiDAR point cloud into ground and non-ground regions to reduce an overall number of points that need to be analyzed by the trained machine learning model, to reduce time and processing resources needed to generate the panoptic labeled LiDAR point cloud.

The trained machine learning model is trained using airport-specific domain knowledge that enables the trained machine learning model to automatically cluster points in the non-ground region into segments that correspond to objects typically found in an airport environment without human involvement. Training the machine learning model based on airport-specific domain knowledge enables the trained machine learning model to identify airport-specific objects in the LiDAR point cloud with increased accuracy relative to a human annotator or a generically trained machine learning model. Moreover, the trained machine learning model leverages the airport-specific domain knowledge to automatically annotate the non-ground segments with airport-specific classification labels (e.g., aircraft, truck, terminal, skybridge, tower) that provide a higher granularity of classification relative to more generic labels (e.g., dynamic object, non-dynamic object labels).

In some implementations, panoptic labeled LiDAR point clouds generated using the computer-implemented approach can be used by a navigation system of an autonomous aircraft. Moreover, particularly, the computer-implemented approach can produce the panoptic labeled LiDAR point clouds suitably fast enough that the information embedded within the panoptic labeled LiDAR point clouds is still accurate enough for the navigation system to operate the autonomous aircraft based on such information.

FIG. 1 shows an example scenario in which an aircraft 100 scans an airport environment 102 with a LiDAR device 104 to acquire LiDAR data for the airport environment 102. In particular, the LiDAR device 104 includes an emitter configured to emit numerous pulses of laser light toward the airport environment 102, such as representative pulses 106. The pulses emitted by the LiDAR device 104 reflect off of surfaces in the airport environment 102 and are received by a sensor of the LiDAR device 104. Each pulse generates an individual point representative of a part of the airport environment 102. The LiDAR device 104 aggregates these points to form a LiDAR point cloud 200 (shown in FIG. 2) that collectively represents the airport environment 102. The number of pulses emitted/received by the LiDAR device 104 to generate a LiDAR point cloud can vary, in accordance with the particular application and without undue experimentation, from that which is shown in FIG. 1. As one example, a LiDAR point cloud of an airport environment can include a range of 2-10 or more points per square meter of the airport environment.

The aircraft 100 may perform a plurality of LiDAR scans of the airport environment 102 from different positions to aggregate points to contribute to the LiDAR point cloud 200 (shown in FIG. 2) throughout different phases of a mission. For example, the aircraft 100 can scan the airport environment 102 with the LiDAR device 104 during taxi, takeoff, approach, and/or landing, depending on the mission. By performing a plurality of LiDAR scans from different positions, different parts of the airport environment 102 can be exposed to the LiDAR device 104 at different positions and captured in the LiDAR point cloud 200 (shown in FIG. 2) to get a panoptic representation of the airport environment 102.

Figure 2:
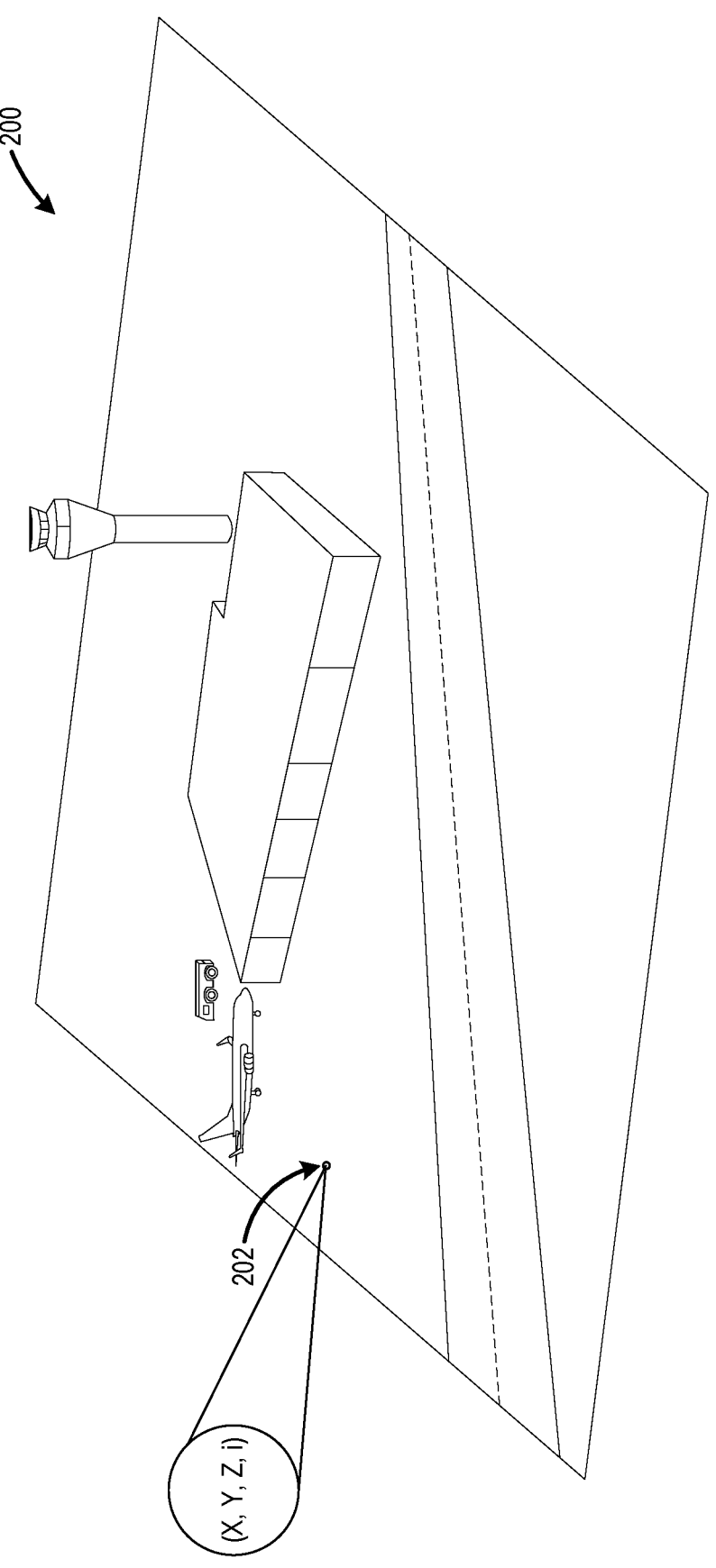
FIG. 2 shows an example LiDAR point cloud of the airport environment of FIG. 1.

Different vehicles outfitted with LiDAR devices may perform scans of the airport environment 102 during a designated time window to collect LiDAR data (e.g., points in the LiDAR point cloud 200 shown in FIG. 2). The LiDAR scans may be performed within the designated time window in order to increase the likelihood that dynamic objects (e.g., vehicles) in the airport environment 102 remain in the same position to be captured in the LiDAR point cloud. Different aircraft may perform LiDAR scans throughout different phases of their respective missions to collect LiDAR data. Different ground vehicles (e.g., tractor vehicles, stairway vehicles, belt loader vehicles) may perform LiDAR scans to collect LiDAR data. Fixed LiDAR devices may be positioned around the airport environment 102 to collect LiDAR data. LiDAR data generated from a plurality of LiDAR scans from different LiDAR devices (attached to vehicles or fixed) can be aggregated to form the LiDAR point cloud 200 (shown in FIG. 2). The LiDAR point cloud 200 (shown in FIG. 2) may be generated in any suitable manner.

FIG. 2 shows the LiDAR point cloud 200 of the airport environment 102 of FIG. 1. Although not specifically depicted in FIG. 2, it is understood by those of ordinary skill in the art that the LiDAR point cloud 200 typically includes a very large collection of individual points plotted in three-dimensional (3D) space. Each point, such as point 202, included in the LiDAR point cloud 200 includes Cartesian coordinates (X, Y, and Z) and an intensity value (i). The intensity value (i) represents the recorded return strength of a laser beam. In one example, the intensity value (i) can be between 1-256. The intensity value (i) varies with the composition of the surface object reflecting the laser beam. For example, a low number may indicate low reflectivity while a high number indicates high reflectivity. The scale of the intensity value (i) can depend on the LiDAR sensor that is taking the measurements. In one example, the intensity scale includes decimal values between [0, 1]. In another example, the intensity scale includes values between [0, 255]. The intensity of the laser beam return can also be affected by the angle of arrival (scan angle), range, surface composition, roughness, and moisture content in the atmosphere when the LiDAR scan is performed. This means that features under the nadir of the LiDAR device usually have higher intensity than the same features along the edges (tilted further), as the returned energy decreases. The intensity values of the LiDAR point cloud 200 may be used for various analysis of the LiDAR point cloud 200. For example, analysis of the intensity values may be performed for data registration, feature extraction, classification, surface analysis, and segmentation, among other types of analysis.

Figure 3:
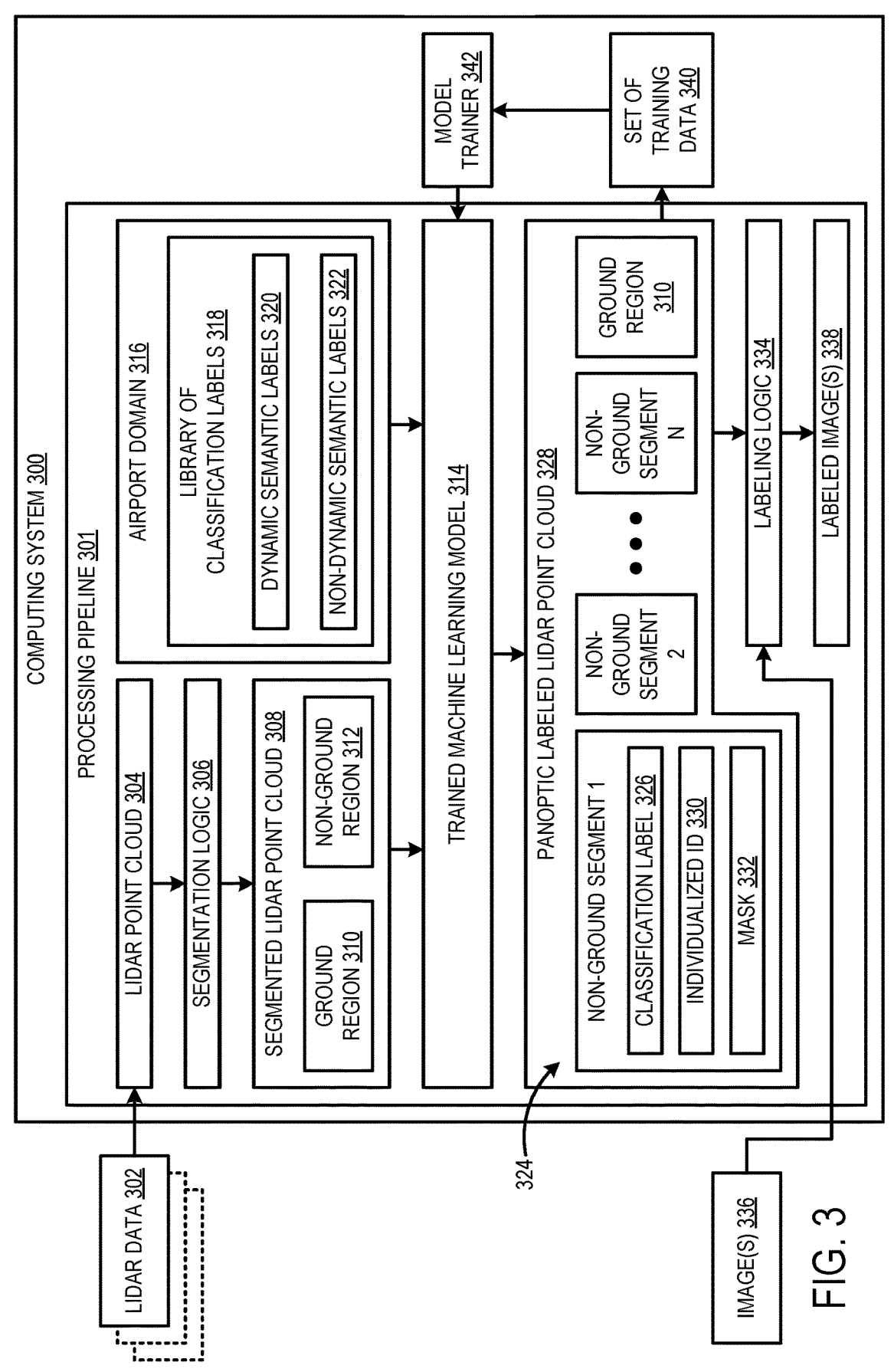
FIG. 3 schematically shows an example computing system configured to automatically annotate a LiDAR point cloud with classification labels to generate a panoptic labeled LiDAR point cloud.

FIG. 3 schematically shows an example computing system 300 configured to execute a processing pipeline 301 that is configured to automatically annotate a LiDAR point cloud, such as the LiDAR point cloud 200 shown in FIG. 2. The processing pipeline 301 is configured to receive LiDAR data 302. The LiDAR data 302 can be received from one or more LiDAR devices that perform one or more LiDAR scans of an airport environment, such as the airport environment 102 shown in FIG. 1. Note that a LiDAR scan can include emitting laser light pulses via an emitter of a LiDAR device into an airport environment and receiving reflected pulses that are reflected off of airport-related objects in the airport environment via a sensor of the LiDAR device.

In some examples, the LiDAR data 302 is received from a single LiDAR device. In some examples, the LiDAR device is an aircraft-mounted LiDAR device. In some examples, the LiDAR data 302 is accumulated from a plurality of LiDAR scans performed by the LiDAR device. In other examples, the LiDAR data 302 is received from a plurality of LiDAR devices. In some examples, the plurality of LiDAR devices are mounted to different vehicles in the airport environment, such as aircraft and ground vehicles. In some examples, at least some of the LiDAR data 302 is received from one or more fixed LiDAR devices positioned within the airport environment. In some examples, the LiDAR data 302 is accumulated from a plurality of LiDAR scans performed by a plurality of LiDAR devices.

The LiDAR data 302 is aggregated by the processing pipeline 301 to form a LiDAR point cloud 304. The LiDAR point cloud 304 includes a plurality of points in the airport environment. More particularly, each point included in the LiDAR point cloud 304 includes X, Y, and Z coordinates and an intensity value (i) representing a reflectivity of a surface in the airport environment.

The processing pipeline 301 includes segmentation logic 306. The segmentation logic 306 is configured to receive the LiDAR point cloud 304 and output a segmented LiDAR point cloud 308 including a ground region 310 and a non-ground region 312. The ground region 310 includes points corresponding to the ground surface in the airport environment. The ground region 310 can include various surface level airport-related objects or features, such as runways, roads, sidewalks, fields, water, etc. The non-ground region 312 includes points corresponding to objects or features above or extending above ground level, such as vehicles, terminals, hangars, air traffic control towers, etc. The segmentation logic 306 may be configured to segment the LiDAR point cloud 304 using any suitable segmentation algorithm or technique. In one example, the segmentation logic 306 segments the LiDAR point cloud 304 using a plane fitting algorithm.

The processing pipeline 301 includes a trained machine learning model 314 that is configured to receive the segmented LiDAR point cloud 308 as input. Additionally, the trained machine learning model 314 is configured to receive an airport domain 316 as input. The airport domain 316 includes a library of classification labels 318 that are specific to airport environments. The library of classification labels 318 includes different types of classification labels including dynamic semantic labels 320 for movable objects (e.g., aircraft, ground vehicles) and non-dynamic semantic labels 322 for fixed objects (e.g., terminals, hangars, air traffic control towers). Note that such classification labels denote objects as being dynamic or non-dynamic. Further, the classification labels denote particular airport-related classes of objects (e.g., aircraft, ground vehicles, terminals, hangars, air traffic control towers).

The trained machine learning model 314 leverages the airport domain 316 to perform automatic clustering and annotation operations that are specialized for airport environments. The trained machine learning model 314 is configured to automatically cluster different points in the non-ground region 312 into a plurality of non-ground segments 324 (e.g., 1, 2, N). The trained machine learning model 314 typically does not perform clustering of points in the ground region 310 in order to reduce consumption of resources and reduce the time it takes to perform the clustering operations.

The non-ground segments 324 represent airport-related objects that are typically found in airport environments. The airport domain 316 informs the trained machine learning model 314 about features of airport-related objects that the trained machine learning model 314 can then recognize and use for making clustering decisions for the non-ground segments 324.

The trained machine learning model 314 is configured to automatically annotate the plurality of non-ground segments 324 with classification labels 326 selected from the library of classification labels 318 of the airport domain 316. In some examples, a non-ground segment 324 corresponding to a moveable object may be labeled with a dynamic semantic label 320. In some examples, a non-ground segment 324 corresponding to a fixed object may be labeled with a non-dynamic semantic label 322.

In some implementations, the trained machine learning model 314 is configured to automatically annotate the plurality of non-ground segments 324 with one or more classification labels 326 and one or more confidences corresponding to the one or more classification labels. A confidence indicates a level of correlation between the non-ground segment and the particular classification label. For example, a higher confidence indicates a stronger correlation with a particular classification label and vice versa. For example, a confidence greater than 90% may indicate a strong correlation that the non-ground segment is, in fact, the particular type of classification. Note that confidences may be assessed based on any suitable threshold. In one example, a non-ground segment might be classified as an aircraft with 95% confidence and a refueling truck with 5% confidence. In this example, the non-ground segment has a strong correlation to the aircraft and a weak correlation to the refueling truck. In some examples, a non-ground segment may be labeled with a plurality of classification labels based at least on a highest determined confidence corresponding to a classification label being below a threshold. The trained machine learning model 314 may be configured to automatically annotate the plurality of non-ground segments 324 with any suitable number of classification labels and corresponding confidences.

The trained machine learning model 314 is configured to output a panoptic labeled LiDAR point cloud 328 including the plurality of non-ground segments 324 labeled with respective classification labels 326 and the points in the ground region 310. The points in the ground region 310 are added back into the panoptic labeled LiDAR point cloud 328, so that it provides a comprehensive representation of the entire airport environment, including airport-related objects that are accurately identified and classified as non-ground segments 324.

In some implementations, the trained machine learning model 314 is configured to generate a plurality of masks 330 corresponding to the plurality of non-ground segments 324. In particular, each mask 330 forms solid surfaces of a non-ground segment (e.g., an airport-related object) that collectively produce a solid representation of the non-ground segment. The trained machine learning model 314 may be configured to texture map the plurality of masks 330 onto the plurality of non-ground segments 324 in the panoptic labeled LiDAR point cloud 328 to make it easier to visually recognize the objects in the panoptic labeled LiDAR point cloud 328.

In some implementations, the trained machine learning model 314 is configured to annotate the plurality of non-ground segments 324 with individualized identifiers 330. By assigning an individualized identifier 330 to each non-ground segment 324, positions of the plurality of non-ground segments 324 can be tracked via respective individualized identifiers 330 across a plurality of panoptic labeled LiDAR point clouds output by the processing pipeline 301 over a designated time period. Such position tracking may allow for the behavior or tendencies of dynamic non-ground segments to be learned and applied to re-training of the trained machine learning model 314 to improve classification accuracy and/or to learn additional functionality.

In some implementations, the mask generation functionality and/or the individualized identifier annotation functionality may be performed by other logic in the processing pipeline 301 instead of the trained machine learning model 314.

The trained machine learning model 314 may take various forms. In some implementations, the trained machine learning model 314 is a neural network. In some implementations, the neural network is a convolutional neural network. In some such implementations, the convolutional neural network is a dynamic graph convolutional neural network. In some implementations, the neural network is a fully connected neural network. In some implementations, the neural network is a one-stage type of neural network, such as a single shot detection neural network. In some implementations, the neural network is a two-stage type of neural network, such as a feature pyramid neural network or a region proposal neural network. The trained machine learning model 314 may be any suitable type of neural network that is trained to classify non-ground segments with airport-based classification labels using any suitable object detection and/or localization techniques.

In some implementations, the processing pipeline 301 includes labeling logic 334 that is configured to receive one or more images 336 of the airport environment captured by one or more cameras. For example, an aircraft equipped with a LiDAR device may also be equipped with an RGB camera, an infrared camera, a night vision camera, and/or another type of camera that outputs images of the airport environment. The labeling logic 334 is configured to receive the panoptic labeled LiDAR point cloud 328. The labeling logic 334 is configured to automatically annotate a plurality of objects in the one or more images 336 with classification labels 326 corresponding to the plurality of non-ground segments 324 in the panoptic labeled LiDAR point cloud 328. In such implementations, the classification information in the panoptic labeled LiDAR point cloud 328 can be leveraged to automatically label the image(s) in a faster and more accurate manner than human annotation of a LiDAR point cloud without any human involvement. Such labeled images may be beneficially used for various applications, such as input for navigation systems of automated aircraft or training data for training machine learning models to automatically label images of airport environments.

In some implementations, the panoptic labeled LiDAR point cloud 328 is included in a set of training data 340. In such implementations, the computing system 300 includes a model trainer 342 that is configured to re-train the trained machine learning model 314 based at least on the set of training data 340. For example, the set of training data 340 may include a plurality of panoptic labeled LiDAR point clouds 328 generated over a designated time period. Such re-training of the trained machine learning model 314 allows for the trained machine learning model 314 to self-learn relevant features directly from the panoptic labeled LiDAR point clouds 328 to improve clustering and classification accuracy with each re-training cycle and without the need for human involvement in the annotation process. The model trainer 342 can re-train the trained machine learning model 314 based at least on any suitable number of panoptic labeled LiDAR point clouds 328. The model trainer 342 can re-train the trained machine learning model 314 according to any suitable frequency in any suitable manner. In some examples, the frequency at which the model is re-trained depends on the residual error of the model, and re-training is performed when new data is processed and new/corner cases are discovered.

Figure 4:
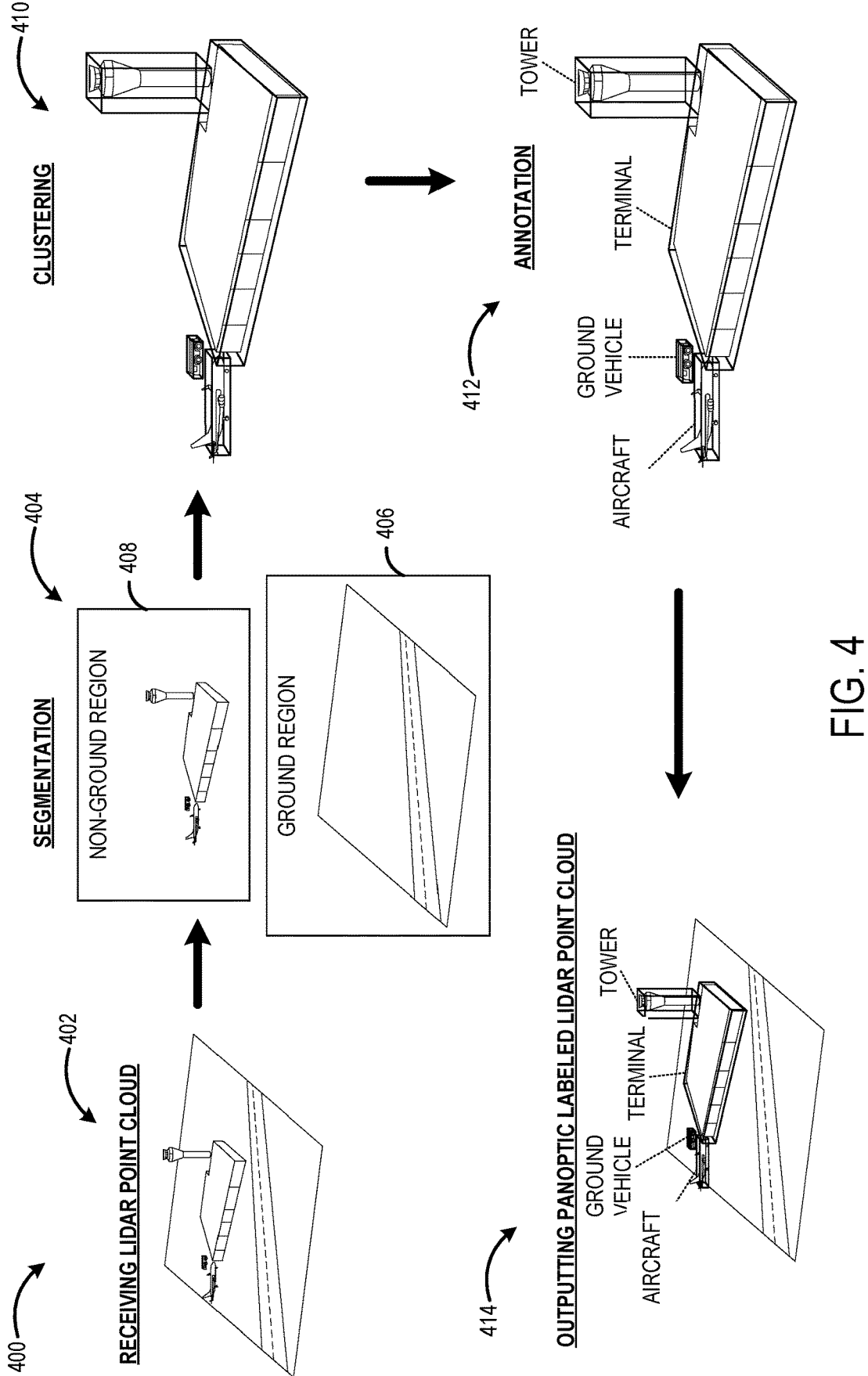
FIG. 4 schematically shows an example process flow for generating a panoptic labeled LiDAR point cloud.

FIG. 4 schematically shows an example process flow 400 according to which the processing pipeline 301 shown in FIG. 3 generates a panoptic labeled LiDAR point cloud 328. At 402, a LiDAR point cloud is received as input. At 404, the LiDAR point cloud is segmented, via the segmentation logic 306, into a ground region 406 of points corresponding to the ground and to a non-ground region 408 of points corresponding to points above the ground. At 410, points in the non-ground region 408 are clustered into non-ground segments via the trained machine learning model 314. At 412, non-ground segments are annotated with classification labels selected from the airport domain via the trained machine learning model 314. At 414, a panoptic labeled LiDAR point cloud 328 is output. The panoptic labeled LiDAR point cloud 328 includes the plurality of non-ground segments labeled with respective classification labels and the points in the ground region.

Figure 5:
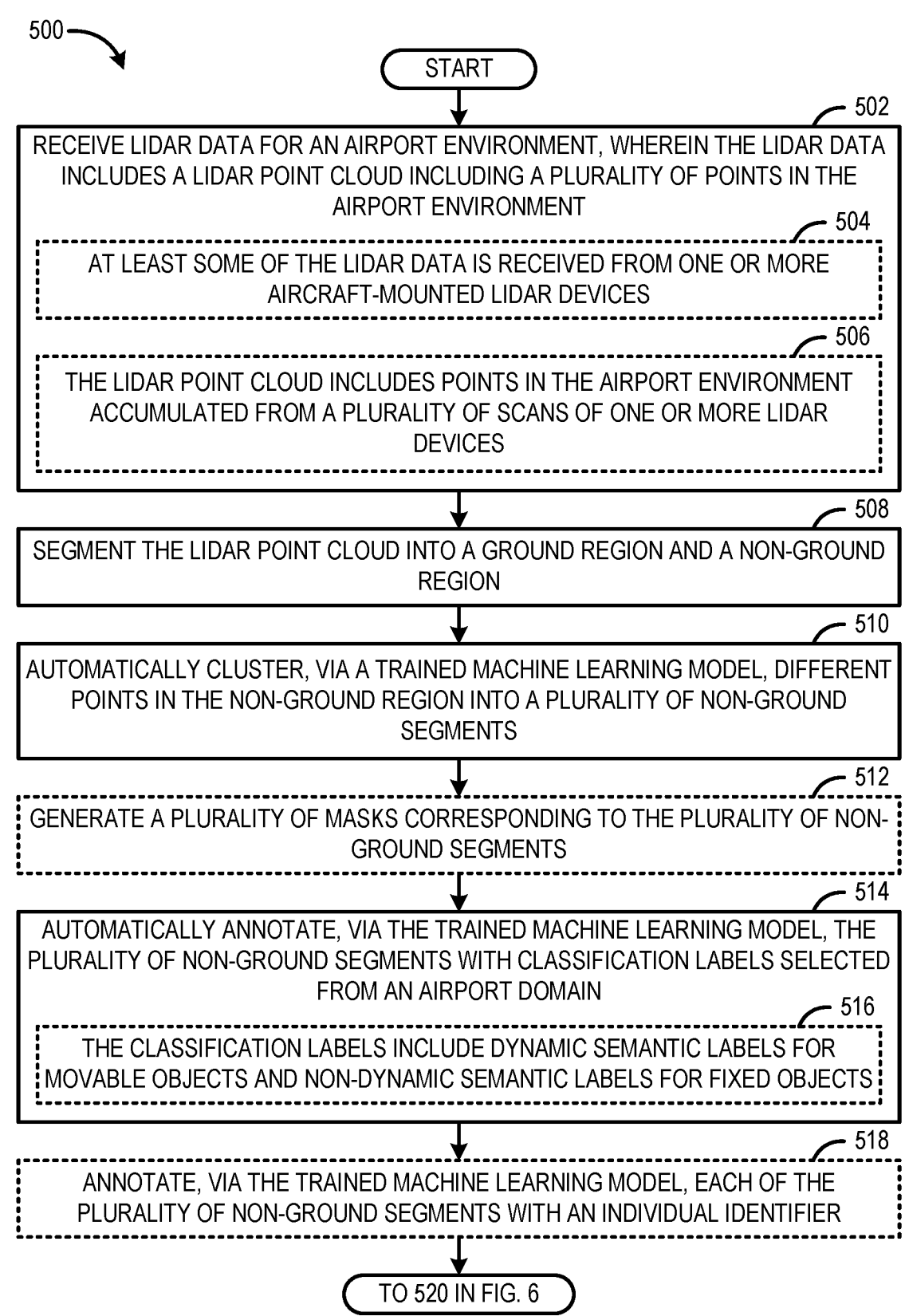

FIGS. 5-6 show a flowchart of an example computer-implemented method 500 for automatically annotating a LiDAR point cloud with classification labels to generate a panoptic labeled LiDAR point cloud. For example, the computer-implemented method 500 may be performed by the computing system 300 shown in FIG. 3 or another computing system.

In FIG. 5, at 502, the computer-implemented method 500 includes receiving LiDAR data for an airport environment. The LiDAR data includes a LiDAR point cloud including a plurality of points in the airport environment. Each point included in the LiDAR point cloud includes X, Y, and Z coordinates and an intensity value (i).

In some implementations, at 502, at least some of the LiDAR data can be received from an aircraft-mounted LiDAR device, such as the LiDAR device 104 mounted to the aircraft 100 shown in FIG. 1.

In some implementations, at 506, the LiDAR point cloud may include points in the airport environment accumulated from a plurality of scans of one or more LiDAR devices. In some examples, the plurality of scans may be performed by the same LiDAR device, such as an aircraft-mounted LiDAR device. In other examples, the plurality of scans be performed by different LiDAR devices, such as different vehicle-mounted LiDAR devices.

At 508, the computer-implemented method 500 includes segmenting the LiDAR point cloud into a ground region and a non-ground region. Any suitable segmentation technique may be used to segment the LiDAR point cloud. In one example, the LiDAR point cloud is segmented by employing a plane fitting segmentation technique that is applied to points aligned with the ground in the airport environment.

At 510, the computer-implemented method 500 includes automatically clustering, via a trained machine learning model, different points in the non-ground region into a plurality of non-ground segments. The non-ground segments may correspond to different objects in the airport environment, such as buildings, vehicles, trees, and other objects. For example, the trained machine learning model may be trained on a set of training data including LiDAR point clouds of airport environments including different airport related objects (e.g., aircraft, ground vehicles, terminals, traffic control towers, runways) at different positions within the LiDAR point clouds.

In some implementations, at 512 the computer-implemented method 500 may include generating a plurality of masks corresponding to the plurality of non-ground segments. Each of the plurality of masks connects groups of points in the non-ground segments to form surfaces in order to visualize identified objects more easily in the LiDAR point cloud.

At 514, the computer-implemented method 500 includes automatically annotating, via the trained machine learning model, the plurality of non-ground segments with classification labels selected from an airport domain. The airport domain includes a library of classification labels corresponding to airport-related objects.

In some implementations, at 516, the classification labels include dynamic semantic labels for movable objects and non-dynamic semantic labels for fixed objects. Note that these semantic classification labels identify an object as being dynamic or non-dynamic, and in addition, identifying the object as being part of a more granular airport-related class, such as an aircraft, ground vehicle, terminal, traffic control tower, runway, or another class of airport-related object.

In some implementations, at 518, the computer-implemented method 500 may include annotating, via the trained machine learning model, each of the plurality of non-ground segments with an individualized identifier. Such individualized identifiers enable positions of the plurality of non-ground segments (e.g., dynamic airport-related objects, such as aircraft or ground vehicles) to be tracked across a plurality of panoptic labeled LiDAR point clouds generated for a designated time period.

In FIG. 6, at 520, the computer-implemented method 500 includes outputting a panoptic labeled LiDAR point cloud including the plurality of non-ground segments labeled with respective classification labels and the points in the ground region. The panoptic labeled LiDAR point cloud provides a comprehensive representation of the airport environment including airport-related objects that are accurately identified and classified.

In some implementations, at 522, the panoptic labeled LiDAR point cloud includes non-ground segments annotated with the individualized identifiers. The individualized identifiers allow for the non-ground segments to be tracked across a plurality of panoptic labeled LiDAR point clouds generated for a designated time period.

In some implementations, at 524, the panoptic labeled LiDAR point cloud includes the plurality of masks aligned with the non-ground segments. The plurality of masks form surfaces of airport-related objects that allow for the airport-related objects to be recognized more easily.

In some implementations, at 526, the computer-implemented method 500 may include receiving one or more images of the airport environment captured by one or more cameras. For example, an aircraft equipped with a LiDAR device may also be equipped with an RGB camera, an infrared camera, a night vision camera, and/or another type of camera that outputs images of the airport environment.

In some implementations, at 528, the computer-implemented method 500 may include automatically annotating a plurality of objects in the one or more images with classification labels corresponding to the plurality of non-ground segments in the panoptic labeled LiDAR point cloud. In such implementations, the classification information in the panoptic labeled LiDAR point cloud can be leveraged to automatically label the image(s) in a faster and more accurate manner than human annotation of a LiDAR point cloud without any human involvement. Such labeled images may be beneficially used for various applications, such as input for navigation systems of automated aircraft or training data for training machine learning models to automatically label images of airport environments.

In some implementations, at 530, the computer-implemented method 500 may include re-training the trained machine learning model based at least on a set of training data including the panoptic labeled LiDAR point cloud. For example, the set of training data may include a plurality of panoptic labeled LiDAR point clouds generated over a designated time period. Such re-training of the trained machine learning model allows for the trained machine learning model to self-learn relevant features (e.g., aircraft, ground vehicles, terminals, hangars, air traffic control towers, and other airport-related objects) directly from the panoptic labeled LiDAR point clouds to improve clustering and classification accuracy with each re-training cycle and without the need for human involvement in the annotation process.

The above systems and methods may be employed to perform unsupervised segmentation, clustering, and annotation of points in a LiDAR point cloud using a trained machine learning model that produces a panoptic labeled LiDAR point cloud faster and having higher classification accuracy relative to a LiDAR point cloud that is annotated by a human.

In some implementations, the methods and processes described herein may be tied to a computing system of one or more computing devices. In particular, such methods and processes may be implemented as a computer-application program or service, an application-programming interface (API), a library, and/or other computer-program product.

Figure 7:
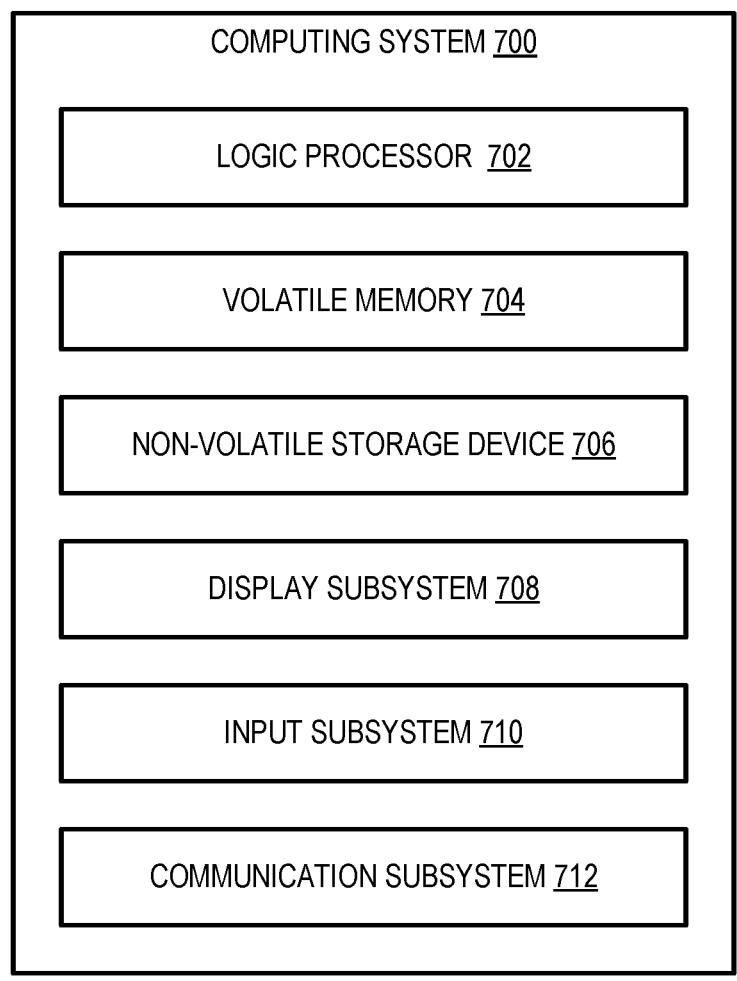
FIG. 7 schematically shows an example computing system that may embody the computing system of FIG. 3.

FIG. 7 schematically shows an example implementation of a computing system 700 that can enact one or more of the methods and processes described above. Computing system 700 may embody the computing system 300 shown in FIG. 3. Computing system 700 may take the form of one or more personal computers, server computers, tablet computers, network computing devices, mobile computing devices, mobile communication devices (e.g., smart phones), wearable computing devices such as smart wristwatches and head mounted augmented reality devices, embedded computing devices, Internet of Things (IoT) computing devices, and/or other computing devices.

Computing system 700 includes a logic processor 702, volatile memory 704, and a non-volatile storage device 706. Computing system 700 may optionally include a display subsystem 708, input subsystem 710, communication subsystem 712, and/or other components not shown in FIG. 7.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, and/or otherwise arrive at a desired result.

The logic processor may include one or more physical processors (e.g., hardware) configured to execute software instructions. Additionally or alternatively, the logic processor may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood by those of ordinary skill in the art without undue experimentation.

Non-volatile storage device 706 includes one or more physical devices configured to hold instructions executable by the logic processors to implement the methods and processes described herein. When such methods and processes are implemented, the state of non-volatile storage device 706 may be transformed—e.g., to hold different data.

Non-volatile storage device 706 may include physical devices that are removable and/or built-in. Non-volatile storage device 706 may include optical memory (e.g., CD, DVD, HD-DVD, Blu-Ray Disc), semiconductor memory (e.g., ROM, EPROM, EEPROM, FLASH memory), and/or magnetic memory (e.g., hard-disk drive, floppy-disk drive, tape drive, MRAM), and/or other mass storage device technology. Non-volatile storage device 706 may include nonvolatile, dynamic, static, read/write, read-only, sequential-access, location-addressable, file-addressable, and/or content-addressable devices. It will be appreciated by those of ordinary skill in the art without undue experimentation that non-volatile storage device 706 is configured to hold instructions even if the supply of power to the non-volatile storage device 706 is interrupted or discontinued.

Volatile memory 704 may include physical devices that include random access memory (RAM). Volatile memory 704 is typically utilized by logic processor 702 to temporarily store information during processing of software instructions. It will be appreciated by those of ordinary skill in the art without undue experimentation that volatile memory 704 typically does not continue to store instructions if the supply of power to the volatile memory 704 is interrupted or discontinued.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and/or complex programmable logic devices (CPLDs), for example.

The terms "module," "program," and "engine," as used herein, may describe an aspect of computing system 700 typically implemented in software by a processor to perform a particular function using portions of volatile memory, which function involves transformative processing that specially configures the processor to perform the function. Thus, a module, program, or engine may be instantiated via logic processor 702 executing instructions held by non-volatile storage device 706, using portions of volatile memory 704. It will be understood by those of ordinary skill in the art without undue experimentation that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine," as used herein, may encompass individual or groups of executable files, data files, libraries, drivers, scripts, database records, etc.

When included, display subsystem 708 may be used to present a visual representation of data held by non-volatile storage device 706. The visual representation may take the form of a graphical user interface (GUI). As the herein described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, or game controller. In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 712 may be configured to communicatively couple various computing devices described herein with each other, and/or with other devices. Communication subsystem 712 may include wired and/or wireless communication devices compatible with one or more different communication protocols. As some examples, the communication subsystem may be configured for communication via a wireless telephone network, or a wired or wireless local- or wide-area network, such as a HDMI over Wi-Fi connection. In some implementations, the communication subsystem may allow computing system 700 to send and/or receive messages to and/or from other devices via a network such as the Internet.

In one example, a computing device, comprises one or more processors configured to execute instructions stored in memory to receive laser imaging detection and ranging (LiDAR) data for an airport environment, wherein the LiDAR data includes a LiDAR point cloud including a plurality of points in the airport environment, segment the LiDAR point cloud into a ground region and a non-ground region, automatically cluster, via a trained machine learning model, different points in the non-ground region into a plurality of non-ground segments, automatically annotate, via the trained machine learning model, the plurality of non-ground segments with classification labels selected from an airport domain, and output a labeled LiDAR point cloud including the plurality of non-ground segments labeled with respective classification labels and the points in the ground region. In this example and/or other examples, the LiDAR point cloud may include points in the airport environment accumulated from a plurality of scans of one or more LiDAR devices. In this example and/or other examples, at least some of the LiDAR data may be received from one or more aircraft-mounted LiDAR devices. In this example and/or other examples, the airport domain may include a library of classification labels corresponding to airport-related objects. In this example and/or other examples, each point included in the LiDAR point cloud may include X, Y, and Z coordinates and an intensity value. In this example and/or other examples, the classification labels may include dynamic semantic labels for movable objects and non-dynamic semantic labels for fixed objects. In this example and/or other examples, the one or more processors may be configured to execute instructions stored in memory to generate a plurality of masks corresponding to the plurality of non-ground segments, and wherein the labeled LiDAR point cloud includes the plurality of masks. In this example and/or other examples, the one or more processors may be configured to annotate each of the plurality of non-ground segments with an individualized identifier. In this example and/or other examples, the one or more processors may be configured to execute instructions stored in memory to receive one or more images of the airport environment captured by one or more cameras, and automatically annotate a plurality of objects in the one or more images with classification labels corresponding to the plurality of non-ground segments in the labeled LiDAR point cloud. In this example and/or other examples, the labeled LiDAR point cloud may be included in a set of training data, and the one or more processors may be configured to execute instructions stored in memory to re-train the trained machine learning model based at least on the set of training data.

In another example, a computer-implemented method comprises receiving LiDAR data for an airport environment, wherein the LiDAR data includes a LiDAR point cloud including a plurality of points in the airport environment, segmenting the LiDAR point cloud into a ground region and a non-ground region, automatically clustering, via a trained machine learning model, different points in the non-ground region into a plurality of non-ground segments, automatically labeling, via the trained machine learning model, the plurality of non-ground segments with classification labels selected from an airport domain, and outputting a labeled LiDAR point cloud including the plurality of non-ground segments labeled with respective classification labels and the points in the ground region. In this example and/or other examples, the computer-implemented method may further comprise generating a plurality of masks corresponding to the plurality of non-ground segments, and wherein the labeled LiDAR point cloud includes the plurality of masks. In this example and/or other examples, the computer-implemented method may further comprise annotating via the trained machine learning model, each of the plurality of non-ground segments with an individualized identifier. In this example and/or other examples, the computer-implemented method may further comprise receiving one or more images of the airport environment captured by one or more cameras, and automatically annotating a plurality of objects in the one or more images with classification labels corresponding to the plurality of non-ground segments in the labeled LiDAR point cloud. In this example and/or other examples, the labeled LiDAR point cloud may be included in a set of training data, and the computer-implemented method may further comprise re-training the trained machine learning model based at least on the set of training data. In this example and/or other examples, the LiDAR point cloud may include points in the airport environment accumulated from a plurality of scans of one or more LiDAR devices. In this example and/or other examples, at least some of the LiDAR data may be received from one or more aircraft-mounted LiDAR devices. In this example and/or other examples, the airport domain may include a library of classification labels corresponding to airport-related objects. In this example and/or other examples, the classification labels may include dynamic semantic labels for movable objects and non-dynamic semantic labels for fixed objects.

In yet another example, a computing device comprises one or more processors configured to execute instructions stored in memory to receive LiDAR data for an airport environment, wherein the LiDAR data includes a LiDAR point cloud including a plurality of points in the airport environment, segment the LiDAR point cloud into a ground region and a non-ground region, automatically cluster, via a trained machine learning model, different points in the non-ground region into a plurality of non-ground segments, automatically annotate, via the trained machine learning model, the plurality of non-ground segments with classification labels selected from an airport domain, output a labeled LiDAR point cloud including the plurality of non-ground segments labeled with respective classification labels and the points in the ground region, wherein the labeled LiDAR point cloud is in a set of training data, and re-train the trained machine learning model based at least on the set of training data including the labeled LiDAR point cloud.

It will be understood by those of ordinary skill in the art without undue experimentation that the configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
   one or more processors configured to execute instructions stored in memory to:
   receive laser imaging detection and ranging (LiDAR) data for an airport environment, wherein the LiDAR data includes a LiDAR point cloud including a plurality of points in the airport environment;
   segment the LiDAR point cloud into a ground region and a non-ground region;
   automatically cluster, via a trained machine learning model, different points in the non-ground region into a plurality of non-ground segments;
   automatically annotate, via the trained machine learning model, the plurality of non-ground segments with classification labels selected from an airport domain, wherein the airport domain includes a library of classification labels corresponding to airport-related objects; and
   output a labeled LiDAR point cloud including the plurality of non-ground segments labeled with respective classification labels and the points in the ground region.

2. The computing device of claim 1, wherein the LiDAR point cloud includes points in the airport environment accumulated from a plurality of scans of one or more LiDAR devices.

3. The computing device of claim 1, wherein at least some of the LiDAR data is received from one or more aircraft-mounted LiDAR devices.

4. The computing device of claim 1, wherein each point included in the LiDAR point cloud includes X, Y, and Z coordinates and an intensity value.

5. The computing device of claim 1, wherein the classification labels include dynamic semantic labels for movable objects and non-dynamic semantic labels for fixed objects.

6. The computing device of claim 1, wherein the one or more processors are configured to execute instructions stored in memory to generate a plurality of masks corresponding to the plurality of non-ground segments, and wherein the labeled LiDAR point cloud includes the plurality of masks.

7. The computing device of claim 1, wherein the one or more processors are configured to execute instructions stored in memory to:

annotate each of the plurality of non-ground segments with an individualized identifier.

8. The computing device of claim 1, wherein the one or more processors are configured to execute instructions stored in memory to:

receive one or more images of the airport environment captured by one or more cameras; and automatically annotate a plurality of objects in the one or more images with classification labels corresponding to the plurality of non-ground segments in the labeled LiDAR point cloud.

9. The computing device of claim 1, wherein the labeled LiDAR point cloud is included in a set of training data, and wherein the one or more processors are configured to execute instructions stored in memory to re-train the trained machine learning model based at least on the set of training data.

10. A computer-implemented method comprising:

receiving LiDAR data for an airport environment, wherein the LiDAR data includes a LiDAR point cloud including a plurality of points in the airport environment;

segmenting the LiDAR point cloud into a ground region and a non-ground region;

automatically clustering, via a trained machine learning model, different points in the non-ground region into a plurality of non-ground segments;

automatically labeling, via the trained machine learning model, the plurality of non-ground segments with classification labels selected from an airport domain, wherein the classification labels include dynamic semantic labels for movable objects and non-dynamic semantic labels for fixed objects; and outputting a labeled LiDAR point cloud including the plurality of non-ground segments labeled with respective classification labels and the points in the ground region.

11. The computer-implemented method of claim 10, further comprising:

generating a plurality of masks corresponding to the plurality of non-ground segments, and wherein the labeled LiDAR point cloud includes the plurality of masks.

12. The computer-implemented method of claim 10, further comprising:

annotating via the trained machine learning model, each of the plurality of non-ground segments with an individualized identifier.

13. The computer-implemented method of claim 10, further comprising:

receiving one or more images of the airport environment captured by one or more cameras; and automatically annotating a plurality of objects in the one or more images with classification labels corresponding to the plurality of non-ground segments in the labeled LiDAR point cloud.

14. The computer-implemented method of claim 10, wherein the labeled LiDAR point cloud is included in a set of training data, and wherein the computer-implemented method further comprises re-training the trained machine learning model based at least on the set of training data.

15. The computer-implemented method of claim 10, wherein the LiDAR point cloud includes points in the airport environment accumulated from a plurality of scans of one or more LiDAR devices.

16. The computer-implemented method of claim 10, wherein at least some of the LiDAR data is received from one or more aircraft-mounted LiDAR devices.

17. The computer-implemented method of claim 10, wherein the airport domain includes a library of classification labels corresponding to airport-related objects.

18. A computing device, comprising:

one or more processors configured to execute instructions stored in memory to:

receive laser imaging detection and ranging (LiDAR) data for an airport environment, wherein the LiDAR data includes a LiDAR point cloud including a plurality of points in the airport environment;

segment the LiDAR point cloud into a ground region and a non-ground region;

automatically cluster, via a trained machine learning model, different points in the non-ground region into a plurality of non-ground segments;

automatically annotate, via the trained machine learning model, the plurality of non-ground segments with classification labels selected from an airport domain;

output a labeled LiDAR point cloud including the plurality of non-ground segments labeled with respective classification labels and the points in the ground region;

receive one or more images of the airport environment captured by one or more cameras; and automatically annotate a plurality of objects in the one or more images with classification labels corresponding to the plurality of non-ground segments in the labeled LiDAR point cloud.

19. The computing device of claim 18, wherein the one or more processors are configured to execute instructions stored in memory to:

automatically annotate each of the plurality of non-ground segments with an individualized identifier.

20. The computing device of claim 18, wherein the classification labels include dynamic semantic labels for movable objects and non-dynamic semantic labels for fixed objects.

* * * * *